US012117720B2

(12) United States Patent
Wang et al.

(10) Patent No.: US 12,117,720 B2
(45) Date of Patent: Oct. 15, 2024

(54) PROJECTION SCREEN AND PROJECTION SYSTEM

(71) Applicant: APPOTRONICS CORPORATION LIMITED, Guangdong (CN)

(72) Inventors: Lin Wang, Guangdong (CN); Wei Sun, Guangdong (CN); Xiaofeng Tang, Guangdong (CN); Fei Hu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 200 days.

(21) Appl. No.: 17/735,685

(22) Filed: May 3, 2022

(65) Prior Publication Data
US 2022/0269159 A1 Aug. 25, 2022

Related U.S. Application Data

(63) Continuation of application No. PCT/CN2020/126552, filed on Nov. 4, 2020.

(30) Foreign Application Priority Data

Nov. 4, 2019 (CN) .......................... 201911067723.2

(51) Int. Cl.
*G03B 21/602* (2014.01)
*G02B 1/04* (2006.01)
(Continued)

(52) U.S. Cl.
CPC ............ *G03B 21/602* (2013.01); *G02B 1/04* (2013.01); *G02B 5/09* (2013.01); *G02B 27/18* (2013.01)

(58) Field of Classification Search
CPC .................................................. G02B 21/602
See application file for complete search history.

(56) References Cited

U.S. PATENT DOCUMENTS 4,767,186 A * 8/1988 Bradley, Jr. .............. H04N 9/31
 359/452
7,835,078 B2 * 11/2010 Ichikawa ............... G03B 21/60
 359/449

FOREIGN PATENT DOCUMENTS

CN  105408777 A  3/2016
CN  108490727 A  9/2018
(Continued)

OTHER PUBLICATIONS https://phydemo.app/ray-optics/simulator/ simulation of US-7835078 structure with JSON and QR-encoded URL, accessed Jun. 7, 2024 (Year: 2024).*

(Continued)

*Primary Examiner* — Leon W Rhodes, Jr.
(74) *Attorney, Agent, or Firm* — Tarolli, Sundheim, Covell & Tummino LLP

(57) ABSTRACT

The present application provides a projection screen and a projection system. The projection screen includes an optical structure layer and a reflective layer, where the optical structure layer includes a plurality of microstructure units; each of the plurality of microstructure units include a first sidewall and second sidewalls; the reflective layer covers at least part of the first sidewall to form a first working surface, and the reflective layer covers at least part of the second sidewalls to form second working surfaces, respectively; the first working surface deflects an input image beam, and at least part of the input image beam is transmitted to viewer's field and the second working surfaces; and the second working surfaces deflect an input image beam came from the first working surface, and the input image beam came from the first working surface is transmitted to the viewer's field. The present application improves the brightness evenness of the projection screen.

17 Claims, 9 Drawing Sheets

(51) Int. Cl.
G02B 5/09 (2006.01)
G02B 27/18 (2006.01)

(56) References Cited

FOREIGN PATENT DOCUMENTS

| | | | |
|---|---|---|---|
| CN | 109388013 A | | 2/2019 |
| CN | 109388014 A | | 2/2019 |
| CN | 109976081 A | | 7/2019 |
| JP | 2003255468 A | | 9/2003 |
| JP | 2011085778 A | | 4/2011 |
| JP | 2011145382 A | | 7/2011 |
| JP | 2013050646 A | | 3/2013 |
| JP | 2014142429 A | * | 8/2014 |

OTHER PUBLICATIONS

International Search Report dated Feb. 1, 2021 for corresponding International Application No. PCT/CN2020/126552.
First Chinese Office Action for 201911067723.2 dated May 25, 2023; Examiner's Name; Shuang Jianli; Examiner code: 30091372.

* cited by examiner

PROJECTION SCREEN AND PROJECTION SYSTEM

CROSS REFERENCE TO RELATED APPLICATIONS

The present application claims priority to Chinese Patent Application No. CN 201911067723.2, filed on Nov. 4, 2019, the content of which is incorporated herein by reference in its entirety.

TECHNICAL FIELD

The present application relates to the technical field of projection, and in particular to a projection screen and a projection system.

BACKGROUND

The screen is an important factor that affects the image quality of the projection display system. The Fresnel reflection on the screen surface is positively related to the incident angle, that is, a larger incident angle can lead to stronger Fresnel reflection. However, most of the reflected light cannot enter the viewer's field of view (FOV), resulting in waste of energy. In addition, due to the uneven Fresnel reflection on the screen surface, the brightness difference between the central region and the edge region of the screen surface is up to 20% or more.

In order to improve the brightness evenness of the screen, in an existing method, an array of polarizers with gradual absorptivity is added to the optical system of the projector to form a projection distribution with a dark center and a bright edge. In another existing method, two projectors are used. However, the above two methods do not involve improving the screen itself, but changing the design of the projector.

SUMMARY

The present application provides a projection screen and a projection system, which can improve the brightness evenness of the projection screen.

The present application adopts a technical solution as follows: a projection screen includes an optical structure layer and a reflective layer. The optical structure layer includes a plurality of microstructure units. Each of the plurality of microstructure units include a first sidewall and second sidewalls. The reflective layer covers at least part of the first sidewall to form a first working surface, and the reflective layer covers at least part of the second sidewalls to form second working surfaces respectively. The first working surface deflects an input image beam, and at least part of the input image beam is transmitted to a viewer's field and the second working surfaces. The second working surfaces deflect the input image beam came from the first working surface, and the input image beam came from the first working surface is transmitted to viewer's field.

To solve the above technical problem, the present application adopts another technical solution as follows: a projection system includes a projection screen and a projection light source. The projection light source is configured to generate an image beam. The projection screen is configured to receive the image beam, process the image beam, and reflect the processed image beam to an FOV region. The projection screen is the projection screen as described above.

The present application has at least the following beneficial effects. The projection screen includes an optical structure layer and a reflective layer. The first working surface of the optical structure layer deflects the input image beam, and transmits the input image beam to the viewer's field and the second working surfaces. The second working surfaces deflect the input image beam and transmit the input image beam to the viewer's field. The projection screen of the present application deflects the projection beam in a plurality of directions, thereby improving the brightness evenness, gain and viewing angle of the projection screen.

BRIEF DESCRIPTION OF DRAWINGS

To describe the technical solutions in the embodiments of this application more clearly, the drawings required to describe the embodiments are briefly described below. Apparently, the drawings described below are only some embodiments of this application. Those of ordinary skill in the art may further obtain other drawings based on these drawings without creative efforts. Figures:

FIG. 10(*b*) is a structural diagram of the microstructure unit according to the embodiment shown in FIG. 5;

FIG. 10(*c*) is a structural diagram of a light spot according to the embodiment shown in FIG. 5;

DETAILED DESCRIPTION

The technical solutions in the embodiments of this application are clearly and completely described below with reference to the accompanying drawings in the embodiments of this application. Apparently, the described embodiments are merely some rather than all of the embodiments of this application. All other embodiments obtained by those of ordinary skill in the art based on the embodiments of this application without creative efforts should fall within the protection scope of this application.

The existing direct projection screen adopts a wire grid structure with the same structure in the horizontal or vertical direction. This structure can only collimate the image beam in a single direction. In addition, the image beam is incident on different positions of the screen at different angles. Therefore, the uncollimated light beam will be transmitted in a region deviated from the viewer's field of view (FOV), resulting in poor brightness evenness of the projection screen and affecting the viewing experience of the viewer.

Figure 1:
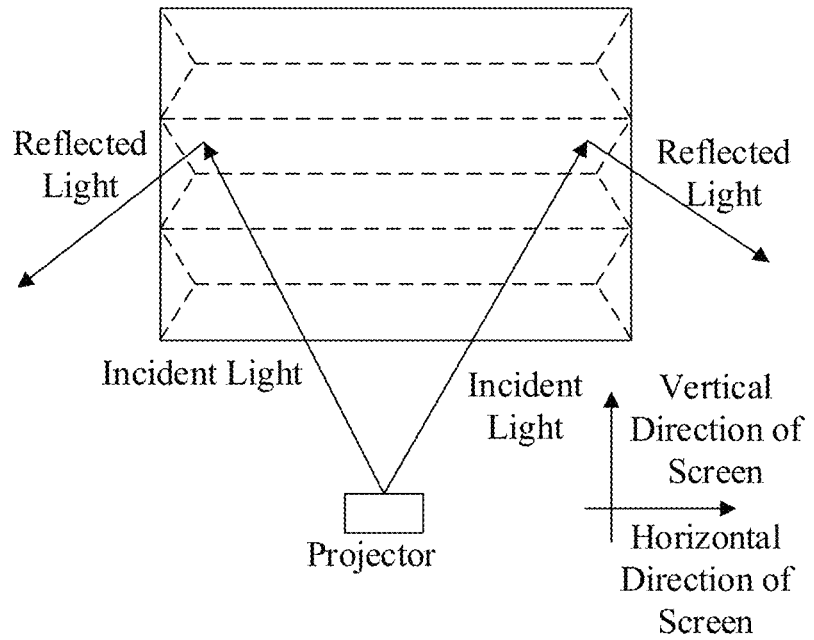
FIG. 1 is a structural diagram of a direct projection screen in a vertical direction and a horizontal direction in the prior art.
Figure 2:
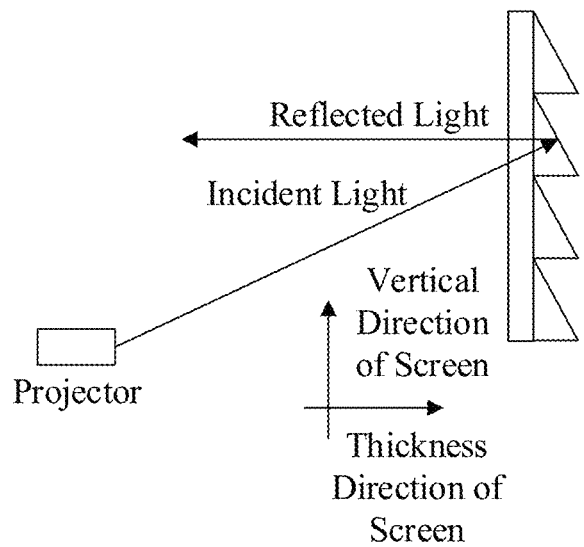
FIG. 2 is a structural diagram of a direct projection screen in a vertical direction and a thickness direction in the prior art.

The existing direct projection screen adopts a horizontal wire grid structure as shown in FIG. 1. This structure collimates the image beam incident at a large angle in the vertical direction, such that more image beams are reflected to the viewer region, as shown in FIG. 2.

Figure 3:
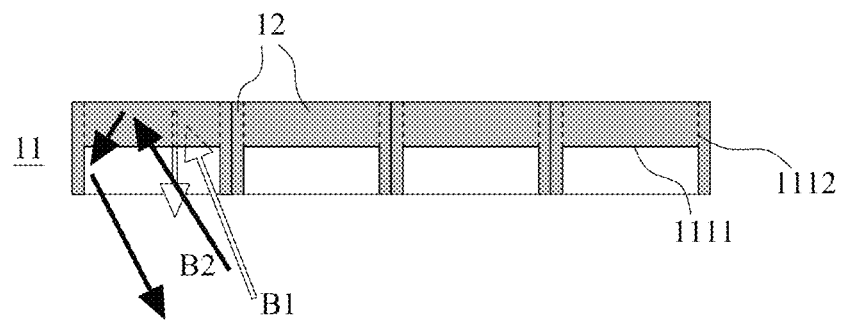
FIG. 3 is a structural diagram of a projection screen according to an embodiment of the present application.
Figure 4:
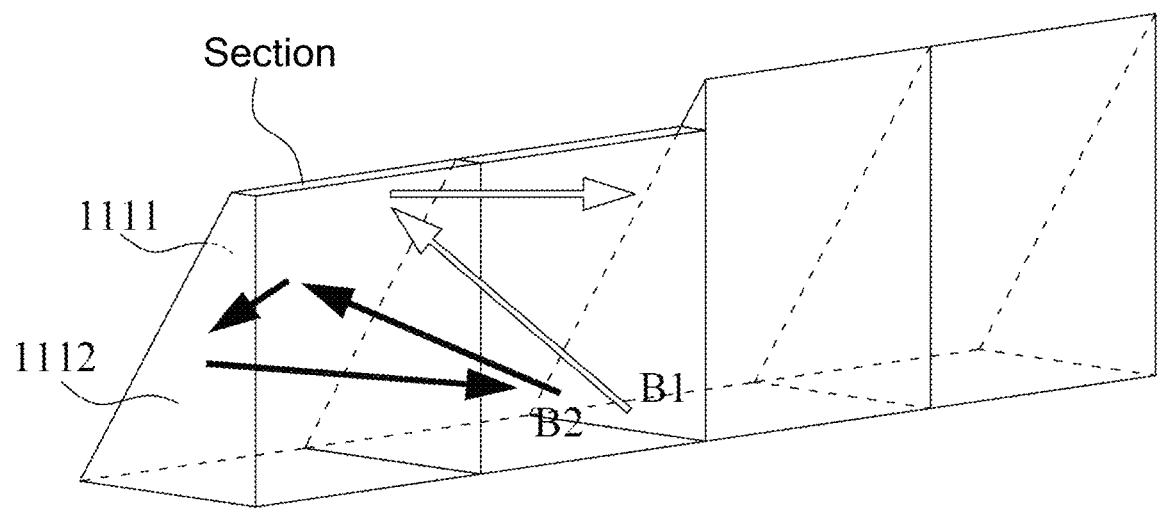
FIG. 4 is a three-dimensional structural diagram of a projection screen shown in FIG. 3.

Referring to FIGS. 3 and 4, FIG. 3 is a structural diagram of a projection screen according to an embodiment of the present application, and FIG. 4 is a three-dimensional structural diagram of the projection screen shown in FIG. 3. The projection screen at least includes an optical structure layer 11 and a reflective layer 12.

The optical structure layer 11 includes a plurality of microstructure units. The microstructure unit includes a first sidewall and second sidewalls. The reflective layer covers at least part of the first sidewall and at least part of the second sidewalls to form first working surface 1111 and second working surfaces 1112.

The first working surface 1111 deflects an input image beam, such that at least a part of the image beam is transmitted to an FOV region and the second working surfaces 1112. The second working surfaces 1112 deflect the image beam from the first working surface 1111, such that the image beam from the first working surface 1111 is transmitted to the FOV region.

In an embodiment, a projection light source generates and outputs an image beam to the projection screen. The projection light source may be a general projector, a short-throw (ST) projector or an ultra-short-throw (UST) projector. The projection beam emitted by the projection light source can be irradiated on the reflective layer 12 through gaps between the microstructure units or directly irradiated on the microstructure units.

In this embodiment, the projection screen includes an optical structure layer 11 and a reflective layer 12. The reflective layer 12 covers at least partial surfaces of the microstructure units of the optical structure layer 11 to form the first working surface 1111 and the second working surfaces 1112. The first working surface 1111 deflects the image beam, such that a part of the image beam is transmitted to the second working surfaces 1112 and the FOV region under the action of the first working surface 1111. The image beam transmitted to the second working surfaces 1112 is transmitted to the FOV region under the action of the second working surfaces 1112. This design improves the brightness evenness of the projection screen, and realizes high gain and wide viewing angle.

For example, as shown in FIGS. 3 and 4, the projection light source produces image beams B1 and B2. The projection beam B1 enters the microstructure unit, and is directly reflected by the first working surface 1111 formed by the microstructure unit and the reflective layer 12 toward the FOV region. The projection beam B2 enters the microstructure unit, and is reflected by the first working surface 1111 formed by the microstructure unit and the reflective layer 12 toward the second working surfaces 1112 formed by the microstructure unit and the reflective layer 12. The projection beam B2 is then reflected by the second working surfaces 1112 towards the FOV region.

It should be noted that, in a conventional viewing environment, the image beam reflected by the screen is preferably a collimated beam. That is, the input image beams B1 and B2 are reflected by the first working surface 1111 and the second working surfaces 1112 to form collimated image beams B1 and B2.

Figure 5:
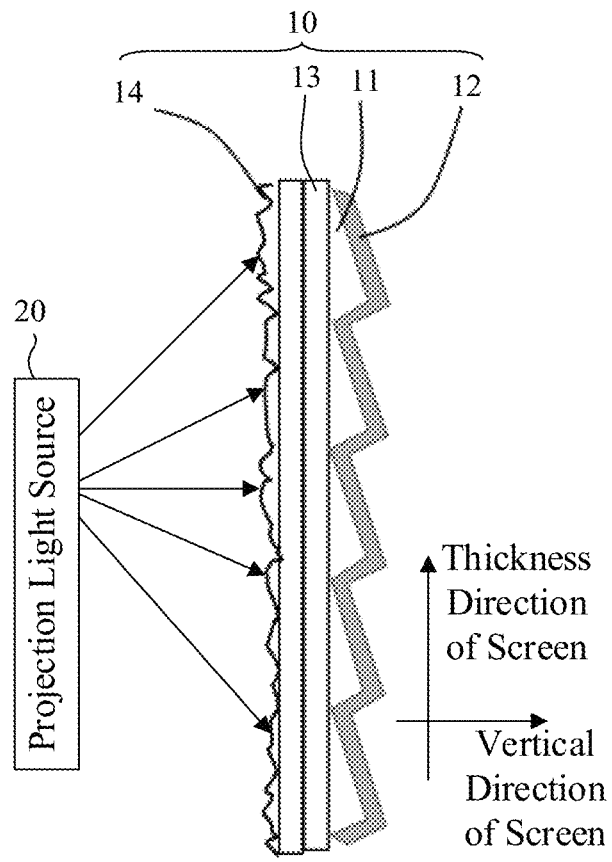
FIG. 5 is a structural diagram of a projection screen according to another embodiment of the present application.

Referring to FIGS. 3 and 5, FIG. 5 is a structural diagram of a projection screen according to another embodiment of the present application. Different from the above embodiment, in this embodiment, the projection screen 10 further includes a substrate 13 and a scattering layer 14.

The divergence angle of the image beam reflected by the reflective layer 12 is generally relatively small, therefore, in order to increase the visible range of the projection screen, the scattering layer 14 may be provided at a side where the projection light source 20 is located. Specifically, the substrate 13 is provided at a side of the optical structure layer 11 away from the reflective layer 12, and the scattering layer 14 is provided at a side of the substrate 13 away from the optical structure layer 11. That is, the projection screen 10 includes the scattering layer 14, the substrate 13, the optical structure layer 11 and the reflective layer 12 which are stacked.

The scattering layer 14 includes at least one of a volume scattering film, an irregular surface scattering film or a regular microlens array film. That is, the scattering layer 14 may be a commercial scattering film structure, such as a volume scattering film, an irregular surface scattering film or a regular microlens array film. These scattering films can be used alone or stacked together to increase the visible range of the projection screen 10.

The substrate 13 is made of an organic material such as polyethylene terephthalate (PET), polycarbonate (PC), polyvinyl chloride (PVC) or polymethyl methacrylate (PMMA).

The microstructure units of the optical structure layer 11 can be fabricated on a master mold by means of precision lathe processing, laser engraving or microstructure development and exposure, and then transferred to a surface of the transparent or gray substrate 13 by heat embossing or ultraviolet (UV) glue transfer.

The reflective layer 12 can be formed outside the optical structure layer 11 from high-reflectivity metal aluminum, silver or a reflective coating with absorbing/scattering particles by magnetron sputtering, thermal evaporation, electron beam evaporation, etc.

It should be understood that the deflection mentioned in this embodiment includes deflection in a horizontal direction and/or deflection in a vertical direction. Specifically, the first working surface 1111 is configured to deflect a part of the image beam in the vertical direction of the projection screen, such that the part of the image beam is collimated and transmitted to the FOV region. The first working surface is further configured to deflect another part of the image beam in the horizontal direction of the projection screen, so as to guide another part of the image beam to the second working surfaces 1112. The second working surfaces 1112 are configured to deflect another part of the image beam in the horizontal direction and/or the vertical direction of the projection screen, such that another part of the image beam is collimated and transmitted to the FOV region of the viewer.

Figure 6:
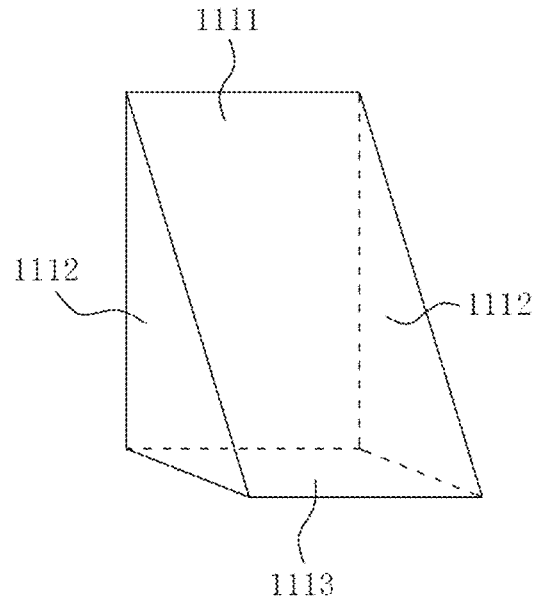
FIG. 6 is a structural diagram of a microstructure unit according to the embodiment shown in FIG. 5.
Figure 7:
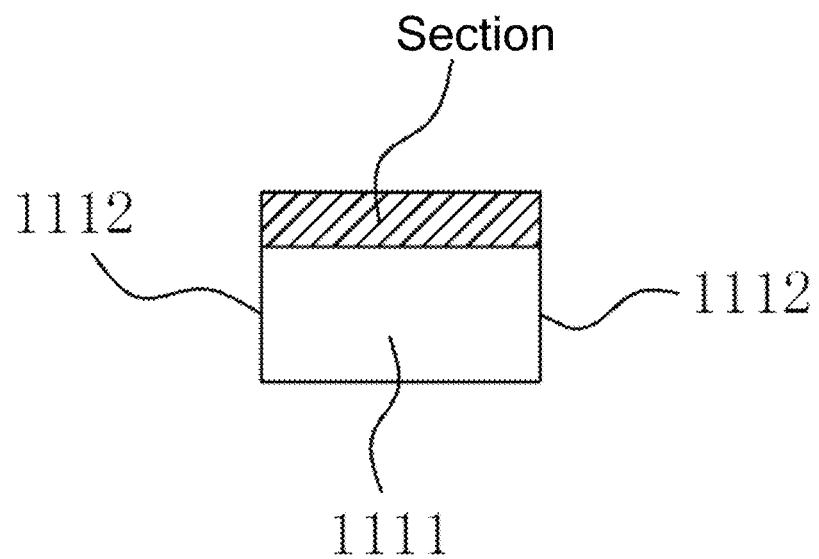
FIG. 7 is a sectional view of the microstructure unit in a horizontal direction of the projection screen shown in FIG. 6.
Figure 8:
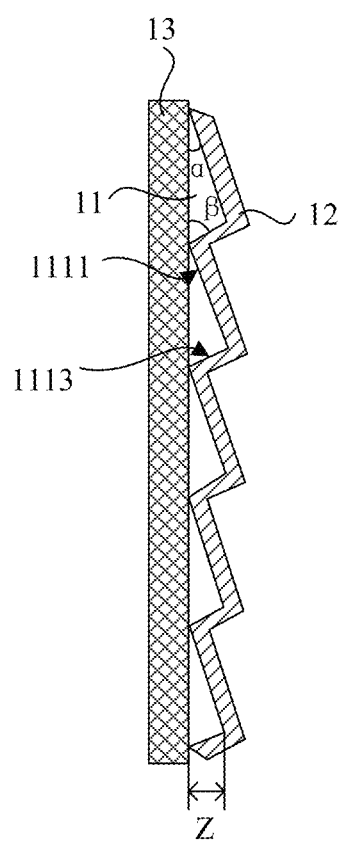
FIG. 8 is a structural diagram of an optical structure layer and a substrate according to the embodiment shown in FIG. 5.

The specific structure of the microstructure units will be described below. As shown in FIGS. 6 and 7, the microstructure unit includes a vertical inclined wall, two vertical sidewalls intersecting with a plane of the surface of the projection screen, a vertical sidewall parallel to the plane of the surface of the projection screen, and a bottom wall. Specifically, the vertical inclined wall is the first sidewall, and the two vertical sidewalls intersecting with the plane of the surface of the projection screen are the second sidewalls. The reflective layer 12 covers at least part of the vertical inclined wall to form the first working surface 1111, and the reflective layer 12 covers the two vertical sidewalls intersecting with the plane of the surface of the projection screen to form the second working surfaces 1112. As shown in FIG. 8, the first working surface 1111 forms a first angle α with the surface of the substrate 13. There are a plurality of unequal first angles α in the vertical direction of the projection screen, that is, the vertical angles between the first working surfaces 1111 of the microstructure units and the substrate 13 are different. Specifically, the plurality of first angles α are not equal at different vertical positions of the same horizontal position, or the a plurality of first angles α are not equal at the same vertical position of different horizontal positions. The first angle α ranges from 4° to 12°. The incident angle of the image beam emitted by a projection system is different at different heights of the screen. Therefore, different angles α are designed in the vertical direction of the projection screen to better collimate the image beam reflected by the screen. Specifically, the incident angles of the image beam emitted by the projection system on the screen gradually increase from bottom to top in the vertical direction of the projection screen. Therefore, it is difficult to achieve collimated reflection of the image beam at the same a angle. If the angles α are designed to gradually increase from bottom to top in the vertical direction of the projection screen, the problem of collimated reflection of the image beam can be solved.

Figure 9:
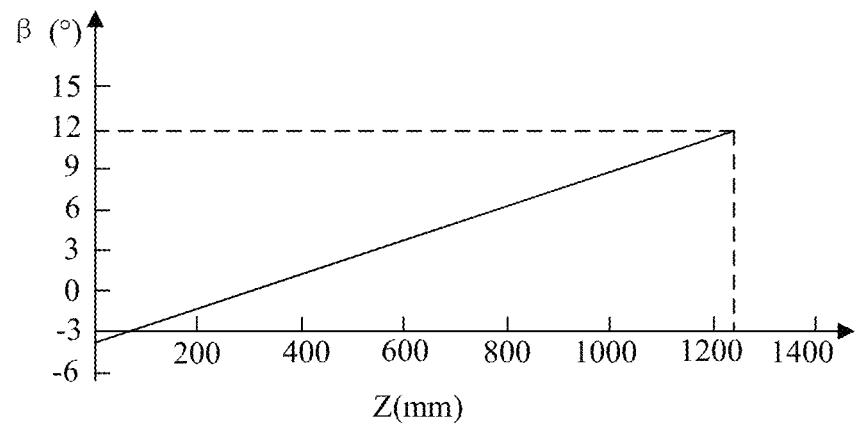
FIG. 9 is a schematic diagram of a relationship between a second angle and a depth of the optical structure layer according to the embodiment shown in FIG. 5.

The microstructure units further include third sidewalls 1113. Specifically, the bottom walls of the microstructure units are the third sidewalls 1113. The third sidewalls 1113 and the surface of the substrate 13 form second angles β, which are 40-90°. The second angles β corresponding to the microstructural units in the entire projection screen 10 may be equal or may not be equal. The corresponding relationship between a depth Z of the microstructure units and the second angle β is shown in FIG. 9, and the corresponding second angle β can be set according to the depth Z of the microstructure units.

Figure 10A:
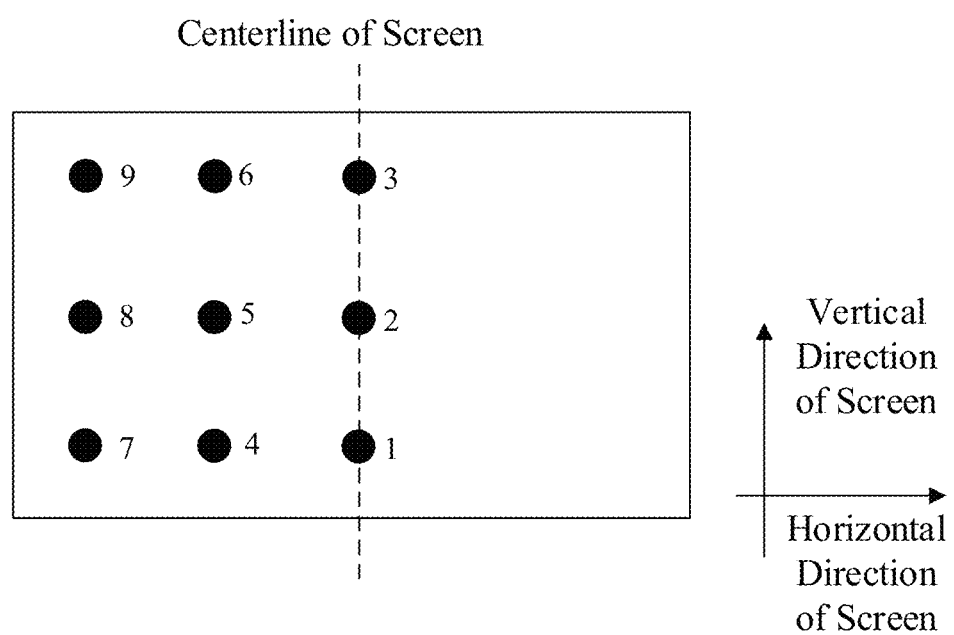
FIG. 10(*a*) is a structural diagram of the projection screen according to the embodiment shown in FIG. 5.
Figure 10B:
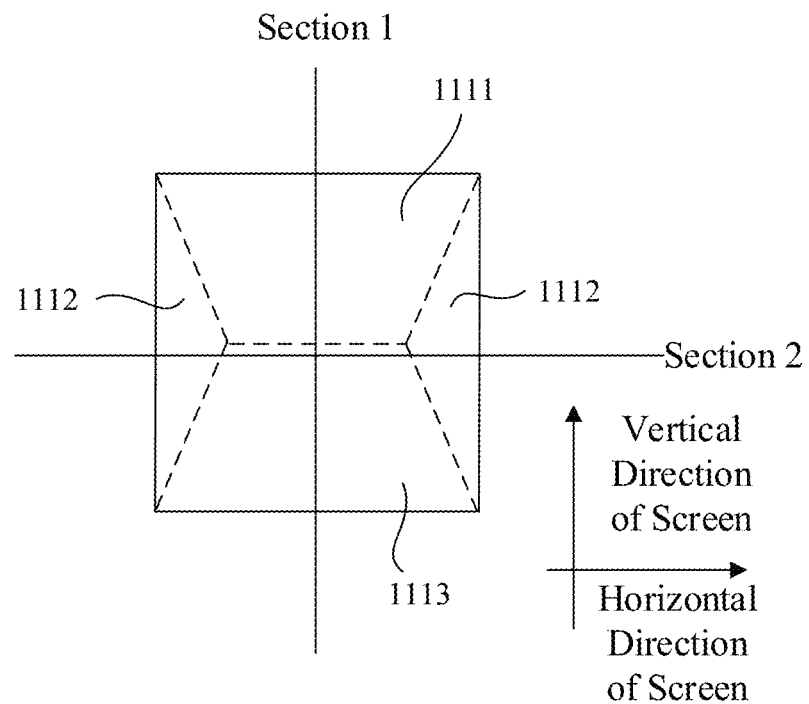
Figure 10C:
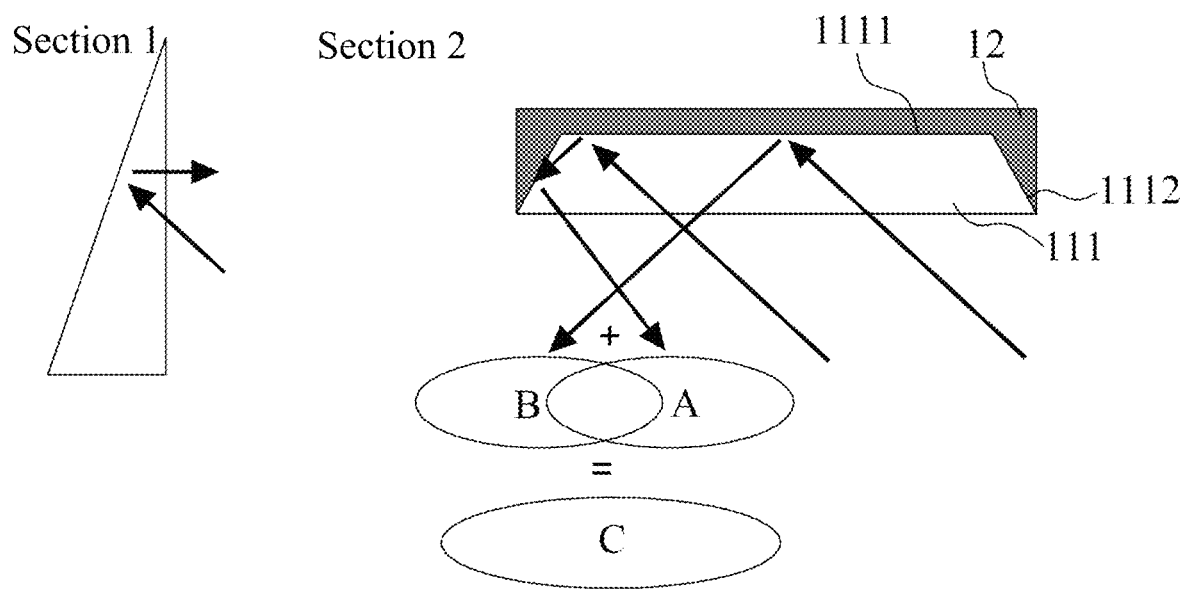

In a specific embodiment, as shown in FIG. 10, FIG. 10(a) is a front view of a projection screen 10 of a certain size. When a projection beam is irradiated on a non-centerline region of the projection screen 10, the image beam is at certain angles with the projection screen 10 in the horizontal and vertical directions. If only a single-directional wire grid structure is used, there will be problems of large viewing angle and poor brightness evenness. In this embodiment, the optical structure layer 11 is composed of triangular prism structures, as shown in section 1 of FIG. 10(c), and the first working surface 1111 collimates the projection beam in the vertical direction. As shown in section 2 of FIG. 10(c), when the projection beam is incident in a non-centerline region of the projection screen 10, the second working surfaces 1112 deflect the image beam in the horizontal direction to another direction to form a light spot A. The image beam not acting on the second working surfaces 1112 forms a light spot B after being reflected by the reflective layer 12. The two light spots are superimposed to obtain a larger light spot C. Therefore, the triangular prism structures can improve the brightness evenness of the projection screen 10 and can increase the viewing angle.

The microstructure units are arranged in an array in the horizontal and vertical directions of the projection screen. That is, the microstructure units are arranged at intervals in the horizontal direction of the projection screen, and the microstructure units are also arranged at intervals in the vertical direction of the projection screen 10. A reflective material is coated between every two adjacent ones of the microstructure units.

Figure 11:
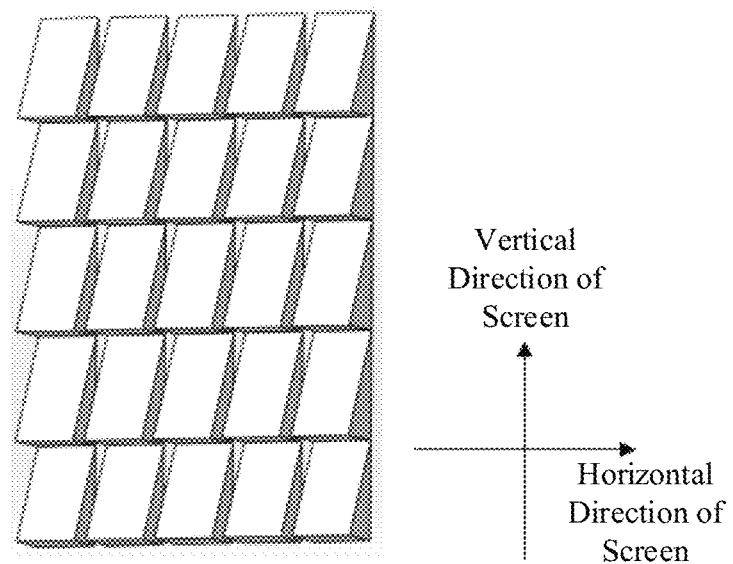
FIG. 11 is a structural diagram of arrangement of microstructure units according to the embodiment shown in FIG. 5.
Figure 12:
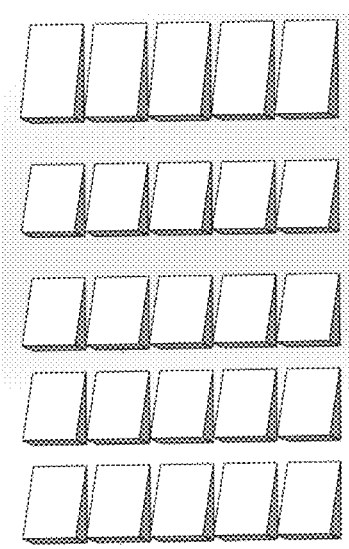
FIG. 12 is another structural diagram of arrangement of microstructure units according to the embodiment shown in FIG. 5.

Referring to FIG. 6, in a specific embodiment, the microstructure units are triangular prism structures. FIG. 6 shows the microstructure units that are triangular prism structures. The two vertical sidewalls intersecting with the plane of the projection screen surface are the bottom surfaces of the triangular prism. The vertical inclined wall, the vertical sidewalls parallel to the plane of the surface of the projection screen, and the bottom wall are the sides of the triangular prism. When the second working surfaces 1112 formed by the triangular prism structure and the reflective layer 12 are perpendicular to the surface of the projection screen 10, in order to fabricate the reflective material on the four sides of the triangular prism structure, the microstructure units are arranged at intervals in the horizontal direction of the projection screen. The microstructure units can be arranged closely without space in the vertical direction of the projection screen, as shown in FIG. 11, and the microstructure units can also be arranged at intervals in the vertical direction of the screen, as shown in FIG. 12. In other embodiments, a selective coating method may also be used, such that there is no reflective material but certain transmittance between two adjacent microstructure units, so as to make the projection screen 10 transflective.

Figure 13:
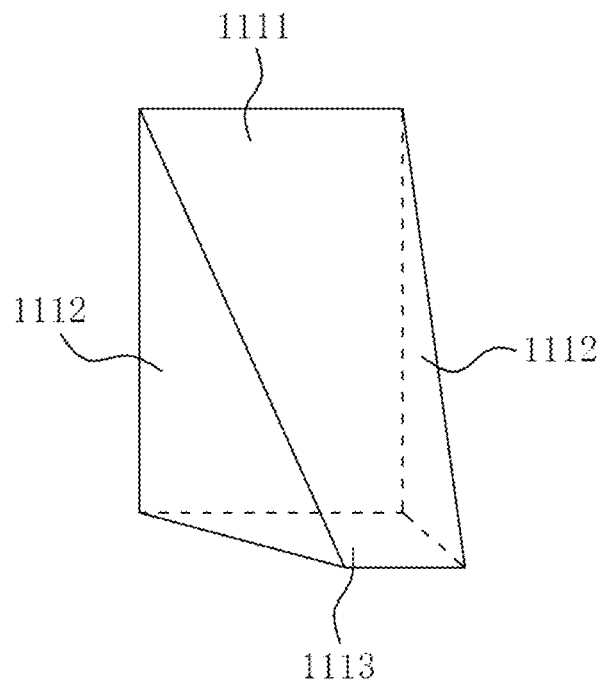
FIG. 13 is another structural diagram of the microstructure unit according to the embodiment shown in FIG. 5.
Figure 14:
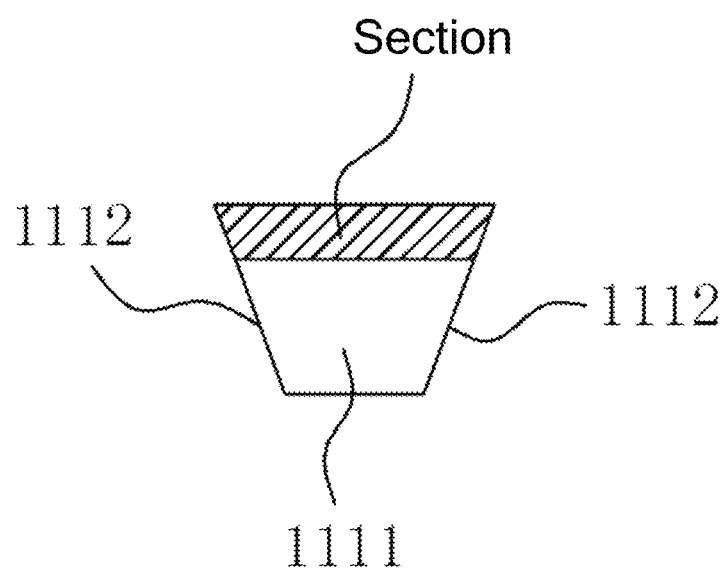
FIG. 14 is a sectional view of the microstructure unit in a horizontal direction of the projection screen shown in FIG. 13.

In another specific embodiment, the microstructure units may also be irregular structures, as shown in FIGS. 13 and 14. The second working surfaces 1112 are not perpendicular to the surface of the projection screen 10. In this case, the vertical sides of two adjacent microstructure units will not completely overlap even if there is no space between them, such that the two adjacent microstructure units are closely arranged.

Figure 15:
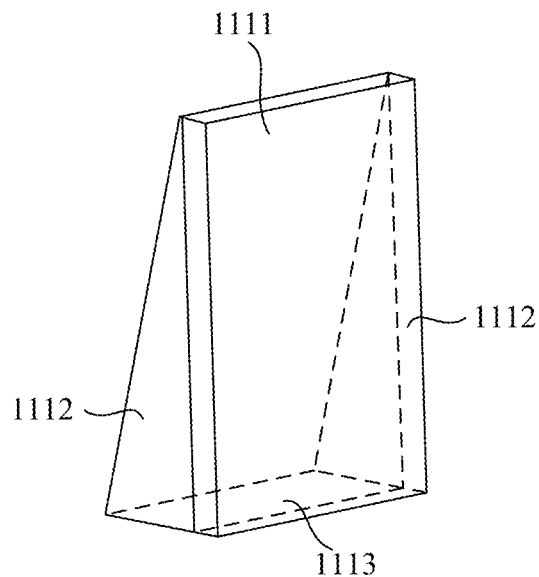
FIG. 15 is another structural diagram of the microstructure unit according to the embodiment shown in FIG. 5.

Since the inclination angle of the first working surface 1111 is relatively small, the depth of the second working surfaces 1112 is relatively small. Therefore, the triangular prism structures shown in FIG. 6 have limited ability to adjust the image beam in the horizontal direction. In order to further increase the evenness of the projection screen 10, the depth of the second working surfaces 1112 can be increased, and the microstructure units can be fabricated into the shape shown in FIG. 15. Specifically, the microstructure unit includes a triangular prism structure and a quadrangular prism structure attached to a sidewall of the triangular prism structure. This can increase the depth of the second working surfaces 1112 and improve the brightness evenness of the projection screen 10. It should be understood that when the microstructure unit is the structure shown in FIG. 15, the microstructure unit further includes a top wall. In addition, the sidewalls forming the second working surfaces 1112 also include the sidewalls of the quadrangular prism structure, which is not repeated herein.

The projection screen 10 in this embodiment is simple in structure, low in cost, high in gain, and high in brightness evenness, and the projection screen 10 can be applied to projection products to provide better viewing effects.

Figure 16:
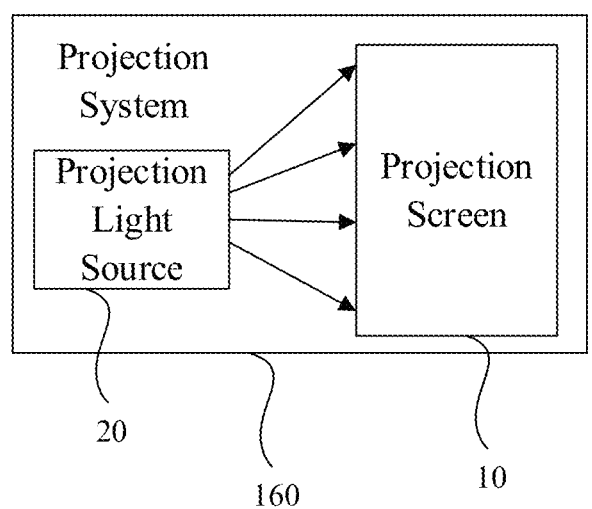
FIG. 16 is a structural diagram of a projection system according to an embodiment of the present application.

Referring to FIG. 16, FIG. 16 is a structural diagram of a projection system according to an embodiment of the present application. The projection system 160 includes a projection screen 10 and a projection light source 20. The projection light source 20 is configured to generate an image beam. The projection screen 10 is configured to receive the image beam, process the image beam, and reflect the processed image beam to an FOV region. The projection screen 10 is the projection screen 10 in the above embodiment.

The projection screen 10 of the projection system 160 can adjust the reflected image beam in horizontal and vertical directions, so as to significantly improve the brightness evenness of the projection screen 10 and ensure a better viewing effect.

The above described are merely implementations of the present disclosure, which do not constitute a limitation on the patent scope of the present application. Any equivalent structure or equivalent process change made based on the description and drawings of the present disclosure, or direct or indirect application thereof in other related technical fields, should still fall in the protection scope of the patent of the present disclosure.

What is claimed is:

1. A projection screen, comprising an optical structure layer and a reflective layer, wherein
    the optical structure layer comprises a plurality of microstructure units, each of the plurality of microstructure units comprises a first sidewall and second sidewalls, and the reflective layer covers at least part of the first sidewall to form a first working surface, and the reflective layer covers at least part of the second sidewalls to form second working surfaces, respectively,
    the first working surface deflects an input image beam, such that a part of the input image beam is transmitted directly to a viewer's field from the first working surface after being deflected by the first working surface and another part of the input image beam is deflected by the first working surface toward the second working surfaces, and then
    the another part of the input image beam is further deflected by the second working to be transmitted to the viewer's field; and
    wherein the plurality of microstructure units have a triangular prism structure, or comprise a triangular prism structure and a quadrangular prism structure which is attached with a sidewall of the triangular prism structure.

2. The projection screen according to claim 1, further comprising
    a substrate, arranged at a side of the optical structure layer away from the reflective layer, and
    a scattering layer, arranged at a side of the substrate away from the optical structure layer.

3. The projection screen according to claim 2, wherein
    the first working surface of each of the plurality of microstructure units forms a first angle with a surface of the substrate, and
    one of the first angles is unequal to others of the first angles in a vertical direction of the projection screen, and one of the first angles is within a range from 4° to 12°.

4. The projection screen according to claim 2, wherein
    each of the plurality of microstructure units further comprise a third sidewall, which forms a second angle with a surface of the substrate, and the second angle ranges from 40° to 90°.

5. The projection screen according to claim 1, wherein the plurality of microstructure units are arranged in a horizontal direction and the vertical direction of the projection screen and form an array; and a reflective material is coated between two of the plurality of microstructure units that are adjacent to each other.

6. The projection screen according to claim 1, wherein
    the first working surface is configured to deflect the part of the input image beam in the vertical direction of the projection screen, and the part of the input image beam is collimated and transmitted to the viewer's field.

7. The projection screen according to claim 6, wherein the first working surface is configured to deflect the another part of the input image beam in a horizontal direction of the projection screen, and guide the another part of the input image beam to the second working surfaces.

8. The projection screen according to claim 6, wherein the second working surfaces are configured to deflect the another part of the input image beam in the horizontal direction and/or the vertical direction of the projection screen, and the another part of the image beam is collimated and transmitted to the viewer's field.

9. The projection screen according to claim 1, wherein
    one of the plurality of microstructure units comprise a vertical inclined wall, two vertical sidewalls intersecting with a plane of a surface of the projection screen, a vertical sidewall parallel to the plane of the surface of the projection screen, and a bottom wall; wherein
    the vertical inclined wall is the first sidewall; and the two vertical sidewalls intersecting with the plane of the surface of the projection screen are the second sidewalls.

10. A projection system, comprising a projection screen, and a projection light source, wherein the projection screen comprises an optical structure layer and a reflective layer,
    the optical structure layer comprises a plurality of microstructure units, each of the plurality of microstructure units comprises a first sidewall and second sidewalls, and the reflective layer covers at least part of the first sidewall to form a first working surface, and the reflective layer covers at least part of the second sidewalls to form second working surfaces, respectively,
    the first working surface deflects an input image beam, such that part of the input image beam is transmitted directly to a viewer's field from the first working surface after being deflected by the first working surface and another part of the input image beam is deflected by the first working surface toward the second working surfaces, and then
    the another part of the input image beam is further deflected by the second working to be transmitted to the viewer's field;
    wherein the projection light source is configured to generate an image beam; and
    the projection screen is configured to receive the image beam, process the image beam, and reflect the processed image beam to a viewer's field; and
    the projection system further comprises a substrate, arranged at a side of the optical structure layer away from the reflective layer, and a scattering layer, arranged at a side of the substrate away from the optical structure layer;

wherein the first working surface of each of the plurality of microstructure units forms a first angle with a surface of the substrate, and one of the first angles is unequal to others of the first angles in a vertical direction of the projection screen, and one of the first angles is within a range from 4° to 12°.

11. The projection system according to claim 10, wherein the plurality of microstructure units have a triangular prism structure, or comprise a triangular prism structure and a quadrangular prism structure which is attached with a sidewall of the triangular prism structure.

12. The projection system according to claim 11, wherein
the plurality of microstructure units are arranged in a horizontal direction and the vertical direction of the projection screen and form an array; and
a reflective material is coated between two of the plurality of microstructure units that are adjacent to each other.

13. The projection system according to claim 11, wherein the first working surface is configured to deflect the part of the input image beam in the vertical direction of the projection screen, and the part of the input image beam is collimated and transmitted to the viewer's field.

14. The projection system according to claim 13, wherein the first working surface is configured to deflect the another part of the input image beam in a horizontal direction of the projection screen, and guide the another part of the input image beam to the second working surfaces.

15. The projection system according to claim 13, wherein the second working surfaces are configured to deflect the another part of the input image beam in the horizontal direction and/or the vertical direction of the projection screen, and the another part of the image beam is collimated and transmitted to the viewer's field.

16. The projection system according to claim 13, wherein the microstructure units are arranged at intervals at least in a horizontal direction of the projection screen or a vertical direction of the projection screen.

17. A projection screen, comprising an optical structure layer and a reflective layer, wherein
the optical structure layer comprises a plurality of microstructure units, each of the plurality of microstructure units comprises a first sidewall and second sidewalls, and the reflective layer covers at least part of the first sidewall to form a first working surface, and the reflective layer covers at least part of the second sidewalls to form second working surfaces, respectively,
wherein the first working surface is configured to deflect a part of the input image beam in the vertical direction of the projection screen, and the part of the input image beam is collimated and transmitted to the viewer's field; or
wherein the first working surface is configured to deflect another part of the input image beam in a horizontal direction of the projection screen, and guide the another part of the input image beam to the second working surfaces;
wherein the second working surfaces are configured to deflect another part of the input image beam in the horizontal direction and/or the vertical direction of the projection screen, and the another part of the image beam is collimated and transmitted to the viewer's field.

* * * * *